No. 613,766. Patented Nov. 8, 1898.
E. H. HODGKINSON.
CLUTCH.
(Application filed Feb. 7, 1898.)

(No Model.)

Witnesses
A. M. Parkins.
Walter R. Dobbs.

Inventor
E. H. Hodgkinson,
By his Attorneys,
Baldwin Davidson & Wight.

THE NORRIS PETERS CO., PHOTO-LITHO., WASHINGTON, D. C.

UNITED STATES PATENT OFFICE.

EDMUND HUGH HODGKINSON, OF LONDON, ENGLAND.

CLUTCH.

SPECIFICATION forming part of Letters Patent No. 613,766, dated November 8, 1898.

Application filed February 7, 1898. Serial No. 669,428. (No model.)

*To all whom it may concern:*

Be it known that I, EDMUND HUGH HODGKINSON, gentleman, a subject of the Queen of Great Britain, residing at 8 Lancaster Gate, London, in the county of Middlesex, England, have invented certain new and useful Improvements in Clutches, of which the following is a specification.

My invention more especially relates to friction-clutches of the class in which the driving part is alternately engaged with and released from the driven part by a friction-band. Its object is to secure a cheap, simple, and effective device. This end I attain by the employment of a self-binding spring-clutch consisting of a thin steel or other suitable spring-band attached by one end to the driving part and lapped around but not attached to the driven part, usually a shaft, or vice versa—that is, the shaft may be the driving part. This band is wound upon itself around the shaft and has a tendency to close itself and embrace the shaft. A forward movement of the driving part immediately causes the band to bind upon itself and on the shaft and so turn the latter. On the other hand, whenever the driving part stops the forward movement of the shaft has a tendency to uncoil the band, thus allowing the shaft to run forward freely.

The accompanying drawings show so much of my improved apparatus as is necessary to illustrate the subject-matter herein claimed.

Figure 1:
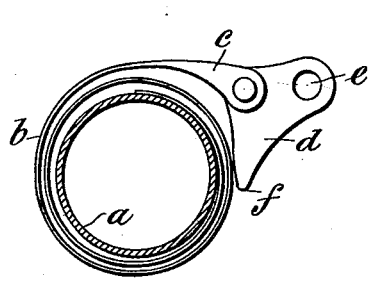
Figure 2:
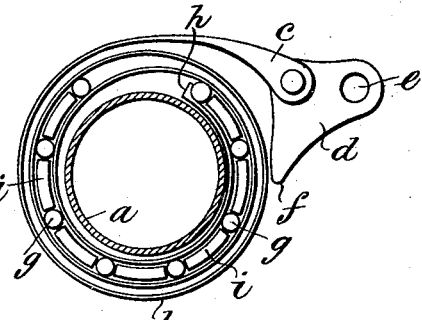
Figure 3:
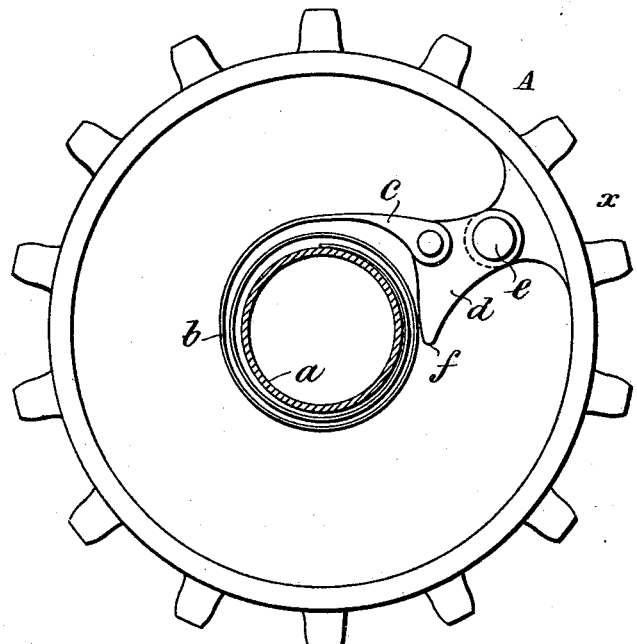

Figure 1 is a vertical transverse section through the clutch; Fig. 2, a corresponding view of a modification thereof. Fig. 3 shows the clutch applied to a sprocket-wheel.

The figures show a shaft $a$, with a band $b$ lapped around it but unsecured thereto. The outer end $c$ of the band may be either attached directly to the driving part or may be pivoted on a triangular link or elbow-lever $d$, attached to the driving part at its upper corner $e$, so that when the driving part moves forward the band is assisted to bind on the shaft by the toe $f$ of the link pressing it against the shaft, the link $d$, as will be seen, thus constituting a friction or pressure brake.

In Fig. 3 the driving part is shown as consisting of a sprocket-wheel A, provided with a lug $x$, to which the elbow-lever $d$ is pivoted.

Fig. 2 shows an organization of parts similar to that shown in Fig. 1, with the addition of rollers $g$, placed between the inner laps of the band. The first roller is kept in position by a projection $h$ on the inner end of the band, and the other rollers are held at a suitable distance apart by spacing-blocks $i$. These rollers cause the clutch to act more quickly, pressing the inner convolution against the shaft, while the outer convolutions in tightening move freely on the rollers, thus diminishing friction.

These spring-clutches are especially applicable to velocipedes and automotor-carriages for transmitting motion only in one direction, so that, for instance, pedals when employed can be stopped when desired.

Having thus fully described the construction and operation of my improved friction-clutch, what I claim therein as new and of my own invention is—

1. The combination, substantially as hereinbefore set forth, of a driving part, a driven part, and a coiled spring having its outer end attached to one part, its convolutions being wound upon themselves, and its inmost convolution encircling but not attached to the other part.

2. The combination, substantially as hereinbefore set forth, of a driving part, a driven part, a link, and a coiled spring having its outer end attached to the link, its convolutions being wound upon themselves, and its inmost convolution encircling but not attached to one of the parts.

3. The combination, substantially as hereinbefore set forth, of a driving part, a driven part, a coiled spring having its outer end attached to one part, its convolutions being wound upon themselves, and its inmost convolution encircling but not attached to the outer part, and rollers interposed between said convolutions to diminish friction and quicken the action of the clutch.

4. The combination, substantially as hereinbefore set forth, of a driving part, a driven part, a link or friction-brake, a coiled spring having its outer end attached to the link, its convolutions being wound upon themselves, and its inmost convolution encircling but not attached to one of the parts, and rollers interposed between said convolutions, for the purposes specified.

EDMUND HUGH HODGKINSON.

Witnesses:
 WALTER J. SKERTEN,
 FREDK. C. WEATHERLY.